United States Patent [19]
McSherry et al.

[11] Patent Number: 5,195,856
[45] Date of Patent: Mar. 23, 1993

[54] DEFORMABLE FASTENING DEVICE

[75] Inventors: Thomas S. McSherry, Medford, N.Y.; Steven D. Townsend; Philip S. Townsend, both of Waterbury, Conn.

[73] Assignee: Titan Technology, Inc., Stamford, Conn.

[21] Appl. No.: 836,136

[22] Filed: Feb. 14, 1992

Related U.S. Application Data

[63] Continuation-in-part of Ser. No. 751,702, Aug. 29, 1991, abandoned.

[51] Int. Cl.⁵ .................. F16B 13/04; F16B 21/00
[52] U.S. Cl. ................................ 411/55; 411/340; 411/342
[58] Field of Search ............ 411/55, 173, 177, 182, 411/340, 342, 344, 345, 913, 34, 60

[56] References Cited

U.S. PATENT DOCUMENTS

| | | | |
|---|---|---|---|
| 4,263,833 | 4/1981 | Loudin et al. | 411/60 |
| 4,289,062 | 9/1981 | Schiefer | 411/340 |
| 4,462,729 | 7/1984 | Uhlig et al. | 411/344 |
| 4,673,150 | 6/1987 | McSherry | |
| 4,704,057 | 11/1987 | McSherry | 411/344 |
| 4,712,956 | 12/1987 | Bond et al. | 411/34 |
| 5,028,186 | 7/1991 | McSherry | 411/340 |

Primary Examiner—Neill R. Wilson
Attorney, Agent, or Firm—Nolte, Nolte and Hunter

[57] ABSTRACT

A fastening device of the type having a stem, toggle arms at the opposite end of the stem, extending outwardly from an extended axis of the stem, a toggle hinge forming a part of the toggle arms and connecting the toggle arms to the stem and elastically biasing the toggle arms in the extended position. The toggle arms are pivotable about the toggle hinge to a closed position extending substantially parallel with the extended axis of the stem. A strap extends across the extended axis of the stem between the extremities of the toggle arms to maintain the toggle arms in the extended position. The extremities of the strap and the toggle arms are connected and a mid-hinge is formed centrally of the strap at the extended axis of the stem so that the portions of the strap on either side of the mid-hinge may pivot about the hinge to move the toggle arms and strap portions to the closed position. Resilient biasing means extend between the strap and toggle arms at positions inwardly displaced from the connections between the extremities of the strap and toggle arms and retain the strap away from the toggle arms with the mid-hinge disposed at or over center and forcing the strap back over center from the closed position. The stem of the fastener is provided with vertical slots to receive portions of the mass of the stem under deformation.

19 Claims, 4 Drawing Sheets

DEFORMABLE FASTENING DEVICE

This is a continuation-in-part of application Ser. No. 07/751,702 filed Aug. 29, 1991 now abandoned.

This invention relates to a deformable fastening device of the type generally used for securing load supporting elements, such as pins, bolts, screws and the like to a structure such as a wall, ceiling or floor.

It is well known in the art to provide a fastening device with winged elements which may be collapsed for insertion into a bore and then expanded either within the bore or beyond the bore (i.e. on the opposite side of a structure) to prevent withdrawal from the bore. The fastener is then adapted to serve as an anchor for a support element such as a screw or pin. With increased use of moldable resilient plastics, fasteners such as shown in the patents to McSherry U.S. Pat. Nos. 3,651,734, 4,752,170, 4,704,057, 4,993,901 and 4,878,790 have been developed.

More particularly, this invention relates to an improvement in the type of wall anchor illustrated in the aforementioned patents in which the winged elements comprise toggle arms which, in their normal position, extend first upwardly from a stem or base forming a live hinge connection to the stem or base and then radially outwardly to their extremities where they are hingedly connected, again via live hinges, to a centrally foldable strap and which are collapsed with the strap to extend axially for insertion into a bore.

In these prior art structures, the connections between the extremities of the toggle arms and strap, and between the inner ends of the toggle arms and stem tend to be rigid because, as live hinges, their natural bias urges them to their molded position when deformed into a sprung position. Consequently, the collapsed arms and strap do not fully contact one another along the meeting surfaces of the folded strap, particularly at the distal ends, making entry into a bore awkward and at times causing damage to the toggle arms.

The rigid spring connections between the stem and toggle arms in prior art structures not only resist complete closing of the toggle arms in the closed position but also complete opening of the toggle arms when reverting to the open position behind the wall structure through which the fastener has been inserted, particularly as their outer surfaces near the stem may be in touching relationship with the inner end of the bore, thus lending more resistance against reversion.

Also, in prior art fasteners of the type described, the center fold area of the strap which connects the extremities of the toggle arms also offers resistance against complete contact of the meeting surfaces of the folded strap because the fold area is also a live hinge, normally positioned above center and is normally formed with a pointed apex resulting in off-center folding when the straps are bent, either to the right or left of the apex.

Further, the structures of such prior art fasteners provide a certain amount of frictional bearing between the wall of the bore, in which the folded toggle arms are inserted, and the edges of the toggle arm and strap structures, the outer surfaces of which are flat. In the instance where the toggle arms are positioned beyond the bore frictional engagement between the stem and bore wall is maintained and the toggle arms tend to open beyond the bore but only to the extent that the strap with its mid-portion folded below center will permit. A tool to perfect the opening of the toggle arms beyond the bore is required to push the center fold of the strap past center so that the toggle arms snap to a position pressing against the inner side of the bore bearing structure. As just noted, the hinge connection between the extremities of the toggle arms and strap in prior art fasteners of this type tend to be rigid and the snapping of the strap over center and of the toggle arms backward can create shock sufficient to at times weaken or break the toggle arms at their connections.

Another problem arises with the use of prior art structures in that the stem from which the toggle arms extend do not provide radial elasticity to a degree necessary to minimize "chewing" of the stem bore by oversized support elements such as screws or the overturning of correctly sized screws. Swelling of prior art stems to accommodate the insertion of these support elements is also minimized by the rigidity of the stem which opposes movement of the stem body around the axis of the stem.

Accordingly, it is an object of our invention to neutralize the connection between extremities of the toggle arms and strap member to diminish the resistance of the strap against its under center position and to provide a less rigid; i.e. soft, live hinge connection between the toggle arms and strap so that the opposing surfaces of the strap and toggle arms and the opposing surfaces of the folded strap meet when in the folded position along their entire length and to soften the shock effects attending the opening of the toggle arms after insertion through a bore.

In this last respect, it is also an object of the invention to shape the strap to provide hinge areas inwardly of the strap extremities, both to accommodate the meeting of the opposing surfaces of the folded strap and to provide additional spring action for positioning the mid-hinge of the strap above center to the open-locked position while maintaining the softness of the spring action of the spring structures connecting the toggle arms and strap.

It is an object of the invention to soften the spring connections of the toggle arms to the stem by diminishing the amount of resilient material in the connections along the outer surfaces thereof by providing flattened arcuate areas there along, thus reducing the resistance against complete folding of the toggle arms to the closed position and to reversion of the arms to the open position.

The neutralizing of the end connections between the strap and toggle arms and the provision of arcuate areas or "soft" springs between the strap and toggle arms creates a problem in fasteners sized to anchor relatively heavy loads. The soft arcuate springs would stretch under relatively heavy loads which pull the stem and tend to force the toggle arms, when opened behind a wall structure, toward the closed position, thus forcing the strap center, already over-center, yet further over center.

Therefore, it is also an object of the invention to provide a compressable web connection between the toggle arms and strap in the arcuate spring areas to permit the folding of the arcuate springs to the spring position and to retain the strap and toggle arms in the opened or locked position by resisting stretching of the arcuate springs.

Similarly, it is an object of the invention to provide a fastener of the type described in which center fold or hinge of the strap is flattened or otherwise diminished at the apex or area of convergence of the lateral strap portions to assure folding at the center of the hinge with a consequent reduction in resistance against complete closing of the strap.

It is another object of the invention to provide additional friction between the toggle arms and the wall surface of a bore. In this respect, the invention also contemplates the shaping of the toggle arms and strap so that when in the folded position within a bore, frictional bearing engagement between the surface of the wall of the bore and the outer surfaces of the folded toggle arms and strap is enhanced.

It is yet a further object of the invention to provide a stem construction which permits deformation about the axis of the stem and increase the elasticity of the stem about its axis.

DETAILED DESCRIPTION OF THE PREFERRED EMBODIMENT

Figure 2:
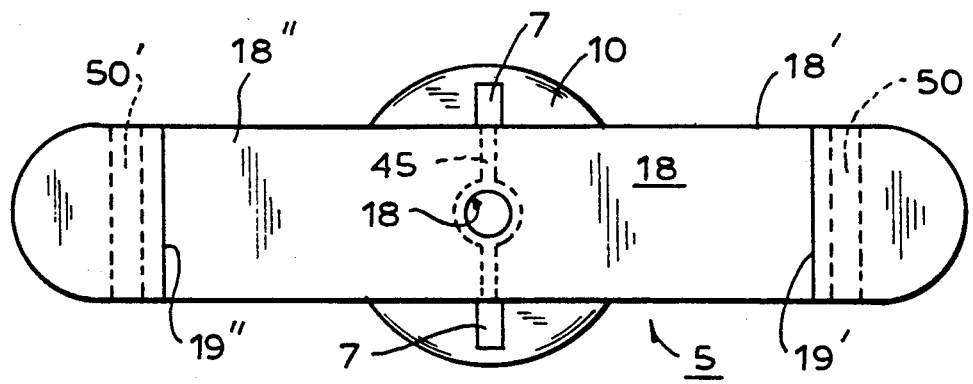
FIG. 2 is a top plan view of the fastener of FIG. 1.

The anchor or fastener is typically formed by injection molding as an integral structure. Suitable resilient plastic material, for the construction of the device include the polypropylenes, polyethylenes, nylons and other moldable substances well known in the art or which may hereafter be developed for suitable elastic deformability for the intended use. Selection of a suitable moldable substance does not form of itself a part of this invention.

Referring to the figures, a fastener 5 comprises a stop flange 10, stem 12, toggle arms 14, 16 and strap 18 which are preferably integrally molded. "Carrying" or "secured to" and like phrases in the further description shall be used, with the same to be understood, for the preferred embodiment, to include an integrally molded structure.

In the disclosed embodiment, the stem 12 is cylindrical with a central opening 6 to receive a support element such as a screw and includes on its outer surface four evenly and circumferentially spaced friction buttresses 7 for restraining the stem within a bore within which the fastener is to be inserted.

The stem is provided with a circumferential indentation 8 adjacent the stop flange 10, circumferentially interrupted by the lower inner portions of the four vertical buttresses 7; and with vertical or axial indentations 9 extending on the front and back of the stem from the stop flange 10 to the top of the stem adjacent a semicircular indentation 11 disposed across the top of the stem and normal to its axis to provide room for or receive the hinge 46 of the strap 18, when the fastener is in the folded or collapsed position.

These indentations 8, 9 decrease the amount of plastic used so that, in the cooling process after molding, "sinking" will be minimized and swelling of the stem by the insertion of a load supporting element is resisted to a lesser degree than if the stem were solid annulus.

Importantly, indentations 9 permit circumferential movement of the mass of the stem body about the walls of the indentations 9, which act much like live hinges so that swelling and clockwise and counterclockwise circular movement of the stem mass about the stem axis caused by the turning of a screw in central opening 6 is accommodated; i.e., received or absorbed, rather than resisted. Resultingly, chewing and breaking of the stem is minimized.

Figure 8:
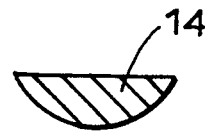
FIG. 8 is a section taken along the lines 8—8 of FIG. 1.

Extending laterally from the axis of the stem 12 are the toggle arms 14 and 16. The toggle arms 14 and 16 are hingedly connected to the stem via live hinges composed of their arcuate inner ends 14' and 16' and are outwardly convex along their outer surfaces, as seen in FIG. 8. They are also connected at their outer ends to strap 18, composed of right and left strap members 18', 18'', by the neutral hinges 21, 22, respectively.

The toggle arm hinges 14, 16' are formed with slight indentations I along the outer arcuate surfaces, flattened along the arcuate curvature to soften the spring action and lessen the resistance against complete folding of the toggle arms to the completely folded position and to the reversion of the arm to the open position. Ramps as shown at the upper and lower edges of the indentations may be provided to eliminate sharp edges. The ramps may also be rounded.

Figure 7:
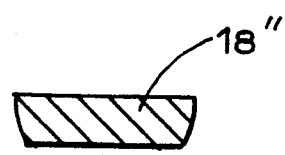
FIG. 7 is a section taken along the lines 7—7 of FIG. 1.

The strap 18 is flat at its top and bottom surfaces and radially rounded, i.e. outwardly convex along its edges, as seen in FIG. 7, so that when the toggle arms and strap are in the folded position, their then outer surfaces form an insert radially rounded along its axial length. The strap members are formed slightly bent inwardly as at 19', 19'' just above spring structure 24, 25 for purposes to be explained more fully below.

Figure 12:
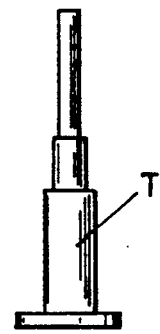
FIG. 12 is a side elevation of a fastener opening tool.

In the open or locked position, the strap extends across the axis of the stem where transverse indentation 45 is located on the undersurface of the strap and where the mid-portion of the strap forms live hinge 46 resulting from the formation of the indentation 45. When the toggle arms are extended beyond a wall bore, as in FIG. 11, the tip of a tool, such as shown in FIG. 12, or screw or other type support element, is received in aperture 48, restricted at its upper opening atop strap 18 at the mid-section of strap 18. Thus, the hinge and center portion of the strap will be pushed axially away from the stem to lock the toggle arms in the open position.

In operation, the screw tip will advance past aperture 48 when the strap center is fully extended and threaded frictional engagement between the screw body and wall of aperture 48, deformed by the screw threads, maintains the toggle arms against the distal side of the wall as the screw is threaded through stem opening 6.

Figure 1:
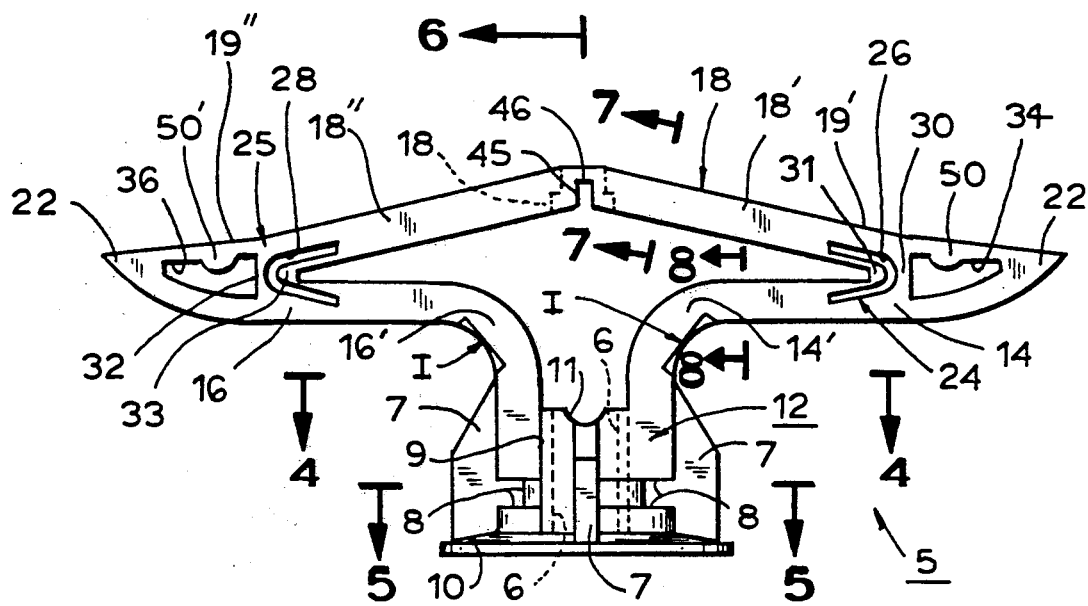
FIG. 1 is a side elevation of a fastener made in accordance with the invention.
Figure 3:
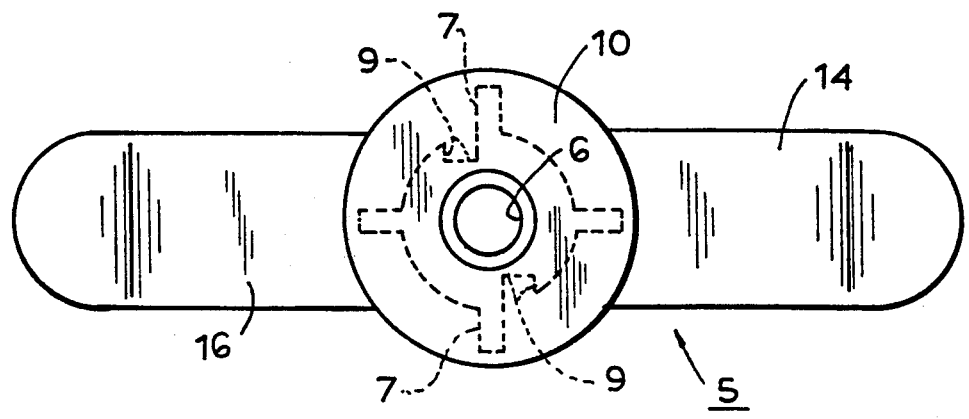
FIG. 3 is a bottom plan view of the fastener of FIG. 1.
Figure 4:
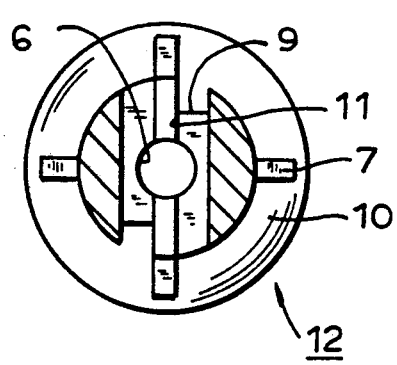
FIG. 4 is a section taken along the lines 4—4 of FIG. 1.
Figure 5:
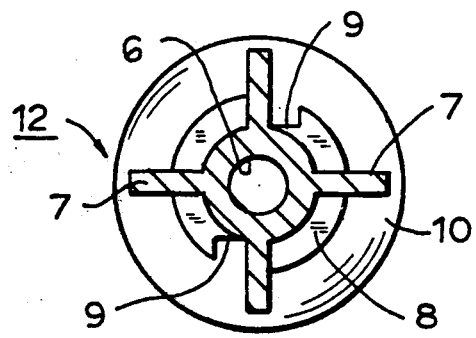
FIG. 5 is a section taken along the lines 5—5 of FIG. 1.
Figure 6:
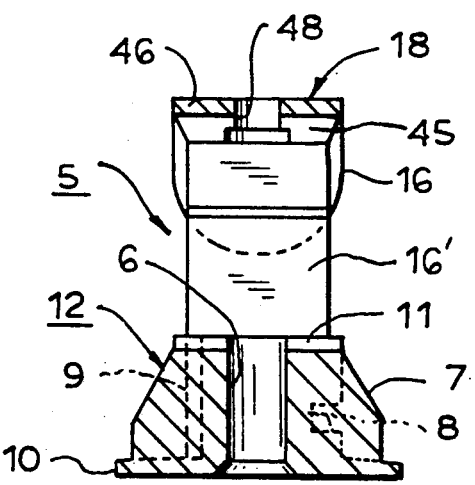
FIG. 6 is a section taken along the lines 6—6 of FIG. 1.

The toggle arms 14, 16 are further secured, inwardly of their connections 21, 22 to the strap 18, by spring structures 24, 25 which as a result of inner arcuate spaces 26, 28 and generally triangular outer spaces 34, 36 formed with inner arcuate bases, between the distal ends of the arms and strap, form arcuate subdivisions 30, 31; 32, 33 which act as live springs to retain the strap 18 and the toggle arms 14, 16 away from one another, augmenting the function of the connections 21, 22 which are molded in the open position shown in FIG. 1.

Protrusions 50, 50' extend into the triangular spaces from the strap members 18, 18' to accommodate knock-out pins in the mold.

It should be noted here that the spring structure formed by the arcuate and triangular spaces at the arm/strap extremities are a radical departure from prior art hinge connections between the strap and toggle arms in which the corners adjoining the strap and toggle arms are filled with plastic material forming rigid hinge connections which provide more forceful retention of the arm/strap separation when in the extended position and also more forceful resistance against the passage of the strap over center when the center of the strap is disposed under center when the toggle arms and strap are in the collapsed and near-collapsed positions.

The fastener is molded in the position shown in FIG. 1 which is the relaxed position, notwithstanding the natural resistance against position change imparted to the toggle/strap structures via the spring elements at their distal extremities and by the live hinge connections of the arcuate inner ends 14', 16' of the toggle arms to the stem. Pressure upwardly on the toggle arms 14 and 16 (as shown in FIG. 1) is also resisted by the strap 18. Thus, subdivisions 30, 31; 32, 33 are springs which bias strap 18 outward from connections 21, 22 so that strap hinge 46 is retained above center to prevent folding of toggle arms 14, 16 to the folded or collapsed position.

Figure 9:
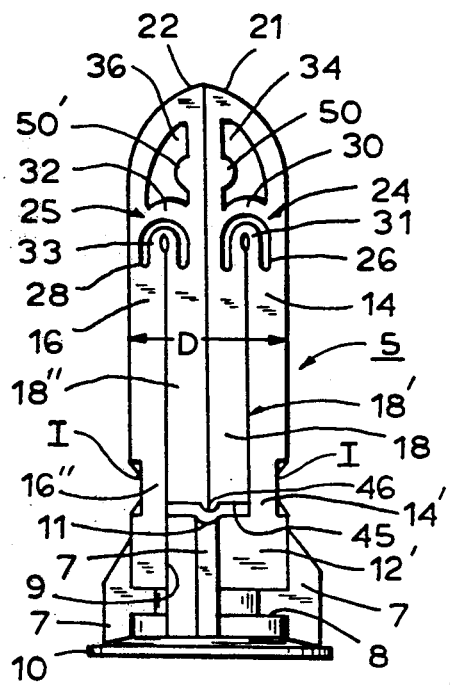
FIG. 9 is a side elevation of the fastener of the previous figures in the closed position in which it is inserted into a pre-drilled bore in a structure.
Figure 10:
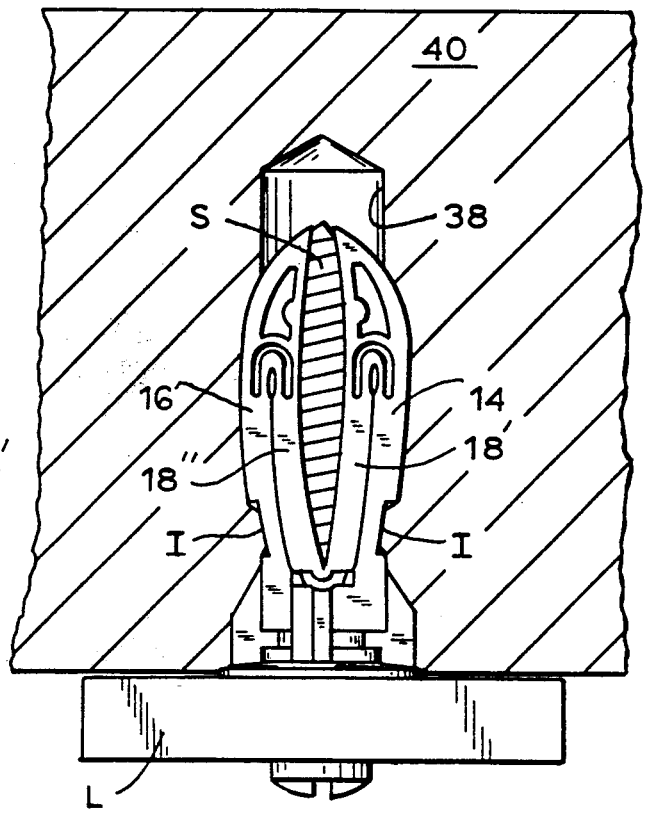
FIG. 10 is a sectional elevation through a thick wall showing a fastener of the invention inserted into a bore.
Figure 9A:
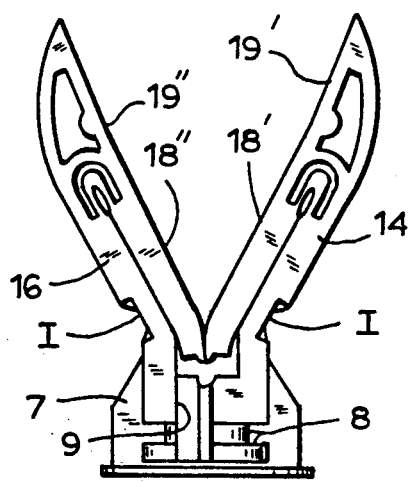
FIG. 9a is a side elevation of the fastener in a partially closed position.

However, the structure may be moved into the position shown in FIGS. 9 and 10 by forcing down the strap members 18', 18" at the hinge 46 toward the stem, past center whereupon the toggle arms 14 and 16 may be moved to the collapsed or folded position shown in FIG. 9. In this position, the upper surfaces of the strap members 18', 18" meet one another all along their length and the opposing surfaces of the toggle arms and strap also meet in touching contiguity along their lengths. This contacted condition of the arm and strap elements is facilitated by the soft hinging at the outer ends of the toggle arms and strap which permit the extension of the collapsing arcuate elements 30, 31 and 32, 33 within slots formed by the walls of arcuate spaces 26, 28 and 34, 36 and the strap members 18', 18" to straighten from the angled relationship between the positions inwardly and outwardly of bends 19', 19" as the portions inwardly of bends 19', 19" pivot about bends 19', 19" as the mid-portion of the strap is forced toward the toggle arms and the strap hinge axially toward the stem. In this respect, bends 19', 19" are live hinges as well, providing additional biasing force to return the inner portions of members 18', 18" to the extended or open position.

It is noted here that the hinge 46 is flattened at the top, thus providing a straight course of uniform thickness across the hinge to assure folding at the center of the hinge and, in any case, with an equal amount of the molded material on either side of the fold. A "V" shaped indentation, not shown, may alternately be made across the top of the flattened top to, again, assure center folding.

When in the collapsed position as shown in FIG. 9, the stem 12, the toggles 14, 16 with their integral straps and springs may be inserted into the bore 38 or 42 of a structure such as a wall 40 or 44. After insertion, the toggles tend to expand to fill the diameter of the bore under the urging of hinges 14', 16', which now function as springs as well, together with live springs 30, 31 and 32, 33.

In the case of a wall bore 38, as in FIG. 10, the outer surface of the toggle arms 14, 16 may have additional frictional elements, peaks or striations, not shown. It should be understood that such frictional elements are not essential in the structures of this invention which provide adequate friction between the toggle arms and wall of the bore because of the action of the spring elements adjacent the distal ends of the toggle arms and strap and because of the provision of a rounded insert composed of the folded arms and strap which facilitates maximized frictional engagement between the wall of the bore, which is normally round, and the folded arms and strap, which as noted provide circumferentially round surfaces. The frictional engagement is particularly enhanced when a support element such as a screw S is inserted through the stem and between the strap members to swell the insert against the bore wall. In prior art structures which present flat strap edges and toggle arms with flat outer surfaces, there are gaps between the bore wall and toggle arms and strap edges where no frictional contact is possible.

Figure 11:
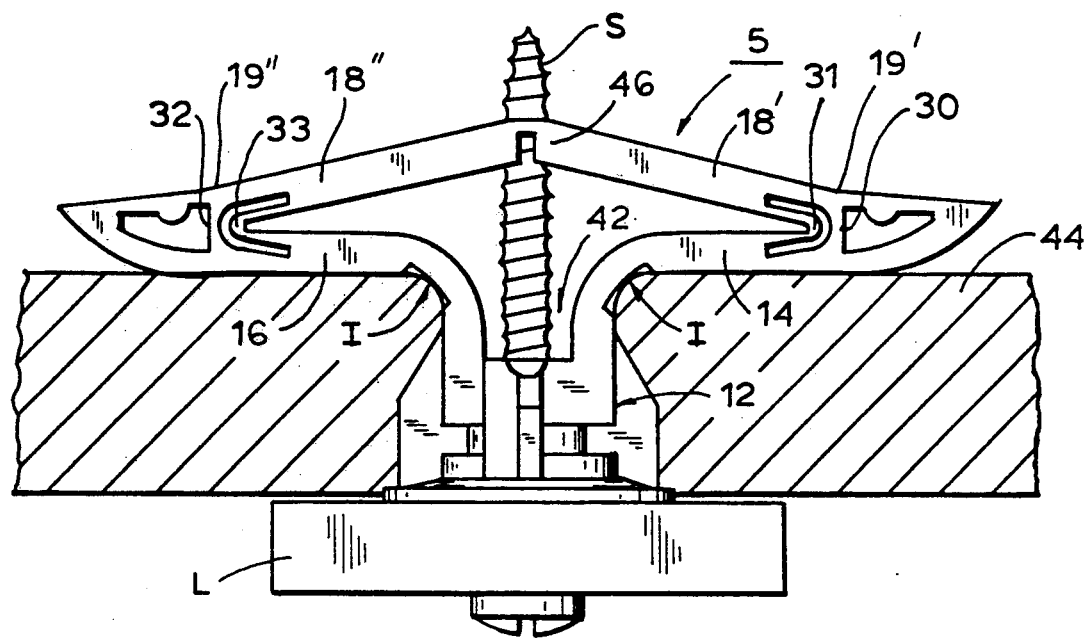
FIG. 11 is a sectional elevation through a wall showing a fastener of the invention with its wings or toggles fully extended after passing through a bore.

Referring to FIG. 11, the more usual use of a toggle fastener of this nature is when a wall 44 has an empty space on the inner or distal side (upper side of FIG. 11). Here, the resilient toggle arms 14, 16 aided by the strap 18 operated by the live springs 30, 31, 32, 33 open the toggle and move the mid-hinge 46 of strap 18 toward the outward locking position just over the center position of the strap. In the fastener of this invention, little urging is needed to dispose the strap over center away from the stem as the formed bends 19', 19" act as live spring hinges to lift the portions of the strap which are inwardly of the bends 19', 19" to their extended position at obtuse angles to the portions of the straps outward of the bends 19', 19". If need be, of course, the strap may be pushed either by a tool (T in FIG. 12) or support element so that, in either case, the toggle arms now provide enormous resistance for supporting loads (L FIGS. 10 and 11) from support means, such as screws S, inserted in the fastener and may not be re-collapsed by pressure resulting from the weight of a load on the support means S shown in FIG. 11 threaded through the bore 6 in the stem 12.

It should be noted, as appears in FIGS. 10 and 11 that the O.D. of the barrel of stem 12 (excluding buttresses 7) corresponds to the distance D in FIG. 9; i.e. the diameter of the toggle arms and strap when the toggle arms and strap are collapsed for insertion into a bore and the arcuate spaces 26, 28 provide room for inner spring elements 30, 33 to fully extend as they bend into spring loaded position. Similarly, outer spring elements 31, 32 bend outwardly into spring loaded position into triangular spaces 34, 36 provided for that purpose. It is this construction which assures that the meeting surfaces of strap 18 are contiguous all along their lengths, and that the toggle arms and strap form a rounded insert with the tips of the connections 21, 22 also in contiguity.

When the arms and strap are located in the bore as in FIG. 10, the spring structures of the fastener force the arms and strap against the bore wall so that they act in concert with the buttresses to provide substantial frictional engagement within the bore, much more so than may be derived from prior art fasteners without the spring elements 30, 31; 32, 33 of the present invention and without circumferentially rounded arm/strap outer surfaces. When a support element such as a screw S is inserted in the central opening 6 of the stem through the aperture 48 of the collapsed strap and extends between the inner surfaces of strap members 18', 18" in the folded position, the strap and arms are bulged against the bore wall to further increase the frictional bearing between the toggle arms and bore wall.

Figure 13:
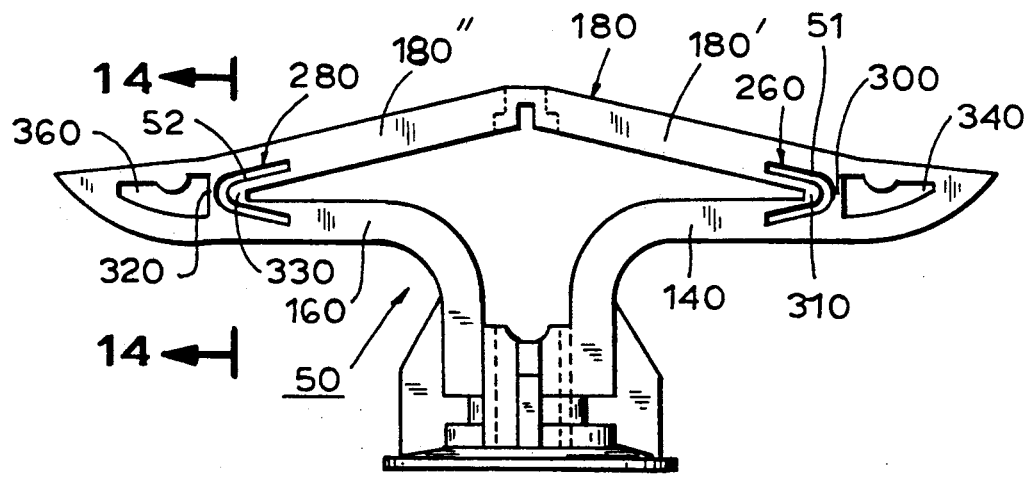
FIG. 13 is a side elevation of a fastener made in accordance with the invention and including compressible web connections between the strap and toggle arms of the fastener in the arcuate spring areas.
Figure 14:
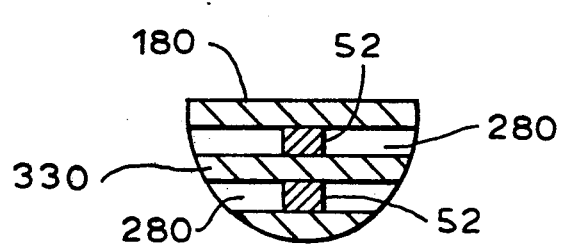
FIG. 14 is a sectional view taken along the lines 14—14 of FIG. 13.

In FIGS. 13 and 14, the fastener 50 incorporates webs 51 and 52 along the plane bisecting the longitudinal extension of the strap 100 and toggle arms 140, 160 and, in this instance, filling the arcuate spaces between arcuate springs 300, 310 and 320, 330. Triangular spaces 340, 360 are left empty to retain the neutralization of the connections between the strap and toggle arm ends. The webs are thick enough to be compressible as the toggle arms and right and left strap members 180', 180" are collapsed to the closed position, permiting arcuate springs 310 and 330 to extend into the spaces 260, 280 in the spring position. When the toggle arms and straps are extended behind a wall structure, the webs act to retain the toggle arms and strap in the locked position and prevent the arcuate springs 300, 310, 320, 330 from stretching under heavy loads. The provision of these webs is optional in fasteners intended to anchor relatively light loads; for example, small anchors for use in a surface panel of a hollow door. It is important in the construction of relatively larger fasteners intended for heavy loads.

The invention is not to be restricted to the embodiment of the invention as disclosed but rather by the following claims.

We claim:

1. A fastener having a stem, a stop flange at one end of said stem having a diameter greater than the diameter of the stem, toggle arms at the opposite end of said stem, said toggle arms extending outwardly from an extended axis of said stem, toggle hinge means forming a part of said toggle arms and connecting said toggle arms to said stem for elastically biasing said toggle arms in the outwardly extended position, said toggle arms being pivotable about said toggle hinge means to a closed position extending substantially parallel with the extended axis of said stem, strap means extending across the extended axis of said stem between the extremities of said toggle arms for maintaining said toggle arms in the extended position, means connecting the extremities of said strap means to the extremities of said toggle arms, a mid-hinge formed centrally of said strap means at the extended axis of said stem and comprising means for pivoting the portions of said strap means extending laterally of the extended axis from an extended position with said toggle arms to a closed position substantially parallel with the extended axis, resilient biasing means extending between said strap and said toggle arms at positions inwardly displaced from said means connecting the extremities of said strap means and said toggle arms for retaining said strap means away from said toggle arms with said mid-hinge disposed at or over center to constitute said strap means as means for locking said toggle arms in the extended position.

2. The fastener of claim 1 further comprising web means extending between said strap and said toggle arms for preventing stretching deformation of said biasing means when said toggle arms and said strap are in the opened position.

3. The fastener of claim 1 further comprising:
a stem bore extending through said stem along the axis of said stem, said stem being cylindrical and having indented area means extending inwardly from the outer surface and axially parallel with the axis of said stem and comprising means for absorbing movement of the mass of said stem when a support element is inserted in said bore and deforms said stem.

4. The fastener of claim 1 further comprising:
said mid-hinge having an inner-under surface and an outer-upper surface, said outer-upper surface extending parallel to a plane normal to the extended axis of said stem, when said strap means is in the extended position with said mid-hinge above center.

5. The fastener of claim 1 further comprising:
said toggle hinge means having indented areas along opposite side outer surfaces thereof in a plane parallel to the extended stem axis and bisecting said toggle arms and constituting means for reducing resistance against movement of said toggle arms when pivoted to and from the closed position.

6. A fastener substantially as set forth in claim 1 and further characterized in that said resilient biasing means are arcuate in form and extend between said toggle arms and said strap inwardly of the extremities of said toggle arms.

7. A fastener substantially as set forth in claim 1 and further characterized in that said resilient biasing means are arcuate in form and have the concave aspect of the arcuate form facing the extended axis of said stem.

8. A fastener substantially as set forth in claim 7 and further characterized in that said resilient biasing means are formed by arcuate slot means for forming at least two arcuate resilient biasing means adjacent each said means for connecting said strap and toggle arms at the extremities of each of said toggle arms.

9. The fastener of claim 8 further comprising web means between said arcuate resilient biasing means for preventing stretching of said resilient biasing means when said toggle arms and said strap are in the opened position.

10. A fastener substantially as set forth in claim 6 wherein said mid-hinge is moveable along the extended axis of said stem toward said stem to an under center position with said toggle arms moved to the closed position and wherein said arcuate resilient biasing means are formed by slot means for receiving said arcuate resilient biasing means as said arcuate resilient biasing means are bent into a spring loaded position by said strap means pivoting about said mid hinge and moving toward said toggle arms against the bias of said arcuate resilient biasing means as said toggle arms and strap means are moved to the closed position.

11. A fastener as substantially set forth in claim 10 wherein said portions of said strap means extending laterally of the extended axis of said stem, when said toggle arms and said strap means are in the extended position, each comprise inner and outer sub-portions, said inner sub-portions extending from said outer sub-portions and converging to said mid-hinge at obtuse angles relative to said outer sub-portions.

12. A fastener as substantially set forth in claim 11 wherein the areas of joinder of said inner and outer sub-portions of said strap means comprise lateral hinge means for pivoting said inner portions of said strap means toward said toggle arms against the bias of said arcuate resilient biasing means as said toggle arms and strap means are moved to the closed position.

13. A fastener as substantially set forth in claim 12 wherein said strap means comprise outer surfaces extending from said mid-hinge to said extremities of said strap means and wherein said outer surfaces meet in substantial contiguity along the opposing surfaces thereof when said toggle arms and said strap means are moved to the closed position.

14. A fastener as substantially claimed in claim 13 wherein said strap means and said toggle arms comprise opposing surfaces on both sides of the extended axis of said stem and wherein said opposing surfaces of said strap means and said toggle arms meet in substantial contiguity when said toggle arms and said strap means are moved to the closed position.

15. A fastener substantially as set forth in claim 1 wherein when said toggle arms and said strap means are in the closed position, said toggle arms and strap means comprise means for insertion through the bore of a structure and said toggle hinge means comprise means for forcing said mid-hinge toward and over center and said resilient biasing means comprises soft live hinge means for urging said strap means away from said toggle arms and the extremities of said strap means comprise neutral biasing means.

16. A fastener as substantially claimed in claim 1 wherein when said toggle arms and said strap means are in the closed position, said resilient biasing means comprise means for urging said strap away from said toggle arms and for urging said toggle arms and strap means away from their closed positions substantially parallel with the extended axis of said stem.

17. A fastener substantially as set forth in claim 16, wherein said toggle arms and strap means comprise means for insertion within a bore of a structure and said toggle arms comprise outwardly convex outer surfaces, said convex surfaces comprising means for bearing against the bore wall.

18. A fastener substantially as set forth in claim 17 wherein said bearing means is swelled by the insertion of a support element through said stem along the axis thereof and between said portions of said strap means so as to constitute said bearing means as means for frictionally engaging the bore wall substantially along the lengths of said toggle arms.

19. A fastener substantially as set forth in claim 18 wherein said portions of said strap means comprise outwardly convex edges and together with said outwardly convex surfaces of said toggle arms comprise a radially rounded insert constituting said toggle arm and strap means as means for frictionally engaging the bore wall substantially along their lengths.

* * * * *